Patented Dec. 23, 1947

2,433,008

UNITED STATES PATENT OFFICE 2,433,008

4,6-DI-TERTIARY-BUTYL-3-METHYLCYCLO-HEXANOL

Arthur C. Whitaker, Oakmont, Pa., and William W. Weinrich, Bartlesville, Okla., assignors to Gulf Research & Development Company, Pittsburgh, Pa., a corporation of Delaware No Drawing. Application May 28, 1945, Serial No. 596,418

1 Claim. (Cl. 260—631)

The present invention relates to the production of a new compound, and more particularly it relates to the production of a hydrogenated polyalkylated phenol, namely, 4,6-di-tertiary-butyl-3-methylcyclohexanol and to a process of producing this compound.

The primary object of the present invention is to provide, as a new compound, a hydrogenated polyalkylated phenol comprising 4,6-di-tertiary-butyl-3-methylcyclohexanol.

Another object of the present invention is to provide, as a new compound, 4,6-di-tertiary-butyl-3-methylcyclohexanol which is adapted to be utilized as a chemical intermediate in the manufacture of plasticizers, pharmaceuticals, detergents, and antioxidants.

A further object of the present invention is to provide a method of converting 4,6-di-tertiary-butyl-3-methylphenol to 4,6-di-tertiary-butyl-3-methylcyclohexanol.

These objects are attained in accordance with the present invention, whereby 4,6-di-tertiary-butyl-3-methylphenol may be catalytically hydrogenated to convert it into 4,6-di-tertiary-butyl-3-methylcyclohexanol by subjecting the phenol to an initial hydrogen pressure of about 1500 pounds per square inch in the presence of a suitable catalyst, heating and agitating the reactants until a reaction temperature of about 170° C. and a pressure of about 2200 pounds per square inch are obtained and continuing said heating until the phenol is completely saturated with hydrogen.

In general, in practicing our invention for the production of 4,6-di-tertiary-butyl-3-methylcyclohexanol by the hydrogenation of 4,6-di-tertiary-butyl-3-methylphenol, we introduce a suitable amount of the polyalkylated phenol and about 8 to 11 per cent, by weight, of a suitable hydrogenation catalyst, such as Raney or other form of nickel, platinum, or palladium, into a suitable pressure-resistant vessel, such as a rocking bomb, which is then closed and charged with hydrogen to the desired pressure; preferably about 1500 pounds per square inch of hydrogen. Heat is then applied to the bomb, for example, electrically, and the bomb is brought up to a reaction temperature of, say, about 170° C. while agitating the contents of the bomb. Approximately two hours are ordinarily required to heat the bomb and its contents to the initial reaction temperature. The bomb is continuously heated, after this initial reaction temperature has been obtained, for a further period of, say, two hours, this time being required for the production of the 4,6-di-tertiary-butyl-3-methylcyclohexanol. At the completion of the reaction as indicated by drop in the pressure of the bomb from, say, about 2200 pounds per square inch to about 2000 pounds per square inch, the bomb is allowed to cool and its contents are removed and filtered to separate the catalyst. The hydrogenation products may then be purified in any desired manner to separate them from the initial undesired starting materials, such as by fractionation.

Because of the practical absence of side reactions, variations in operating conditions apparently have little influence on the character of the product when complete hydrogenation is desired as in the present invention; only the rate of reaction is altered.

Yields obtained by our method approach the theoretical values.

Example 1

This example relates to the preparation of 4,6-di-tertiary-butyl-3-methylcyclohexanol from 4,6-di-tertiary-butyl-3-methylphenol. 79 parts of 4,6-di-tertiary-butyl-3-methylphenol, 8 parts of Raney nickel catalyst, and 1500 pounds per square inch of hydrogen were charged to a rocking bomb. The bomb was electrically heated for a period of about 2 hours until a reaction temperature of about 170° C. and a pressure of about 2200 pounds per square inch were obtained. The reaction was completed after the heating had been continued for a further period of about 2 hours, and when a temperature of about 220° C. and a final pressure of about 2000 pounds per square inch had been attained. The pressure drop was most rapid at 195° C. and at a pressure of about 2150 pounds per square inch. After cooling the bomb, the contents thereof were discharged and filtered and the product thus obtained, after fractionation, had the following composition and boiling point:

|  | B. P. | Per cent C | Per cent H |
|---|---|---|---|
| Calculated | | 79.64 | 13.27 |
| Found | 149–53° C./20 mm | 79.70 | 13.22 |

Example 2

220 parts of 4,6-di-tertiary-butyl-3-methylphenol, 22 parts Raney nickel catalyst and hydrogen at a pressure of 1500 pounds per square inch were charged to a rocking bomb. The bomb was heated as in Example 1 to a temperature of 185°

C. The reaction was completed after the heating had been continued for a further period of 2¾ hours when a temperature of 235° C. and a final pressure of 2000 pounds per square inch had been attained. The highest pressure attained during the heating was 2420 pounds per square inch. The bomb was cooled, the contents thereof discharged and filtered and the product obtained after fractionation had a composition and boiling point substantially identical with the product of Example 1.

It will be understood that the degree of hydrogenation is not destructive, i. e. the hydrogenation is not carried on to the extent that the OH group is reduced to give a hydrocarbon nor are the rings opened nor any groups removed.

It will be understood that the temperature necessary to carry on a relatively mild hydrogenation is dependent upon the pressure and the higher the operating pressure the lower the temperature required to effect hydrogenation. The initial pressure is not as important as the pressure on the material when heated or the pressure at the end of the reaction. There must be sufficient hydrogen present at the end of the reaction to insure completion of the hydrogenation desired, the final excess of hydrogen being indicated by the pressure of hydrogen at that stage.

The pressure of operation may vary between 1500 and 2500 pounds per square inch and the temperature of reaction may be in the range 160° to 230° C. The time of reaction will depend upon the temperature and pressure selected and the pressure drop as the reaction progresses will indicate the end of the reaction.

The compound produced by the present invention is adapted to be employed as a chemical intermediate in the manufacture of pharmaceuticals, detergents, and antioxidants. The compound is a low melting solid and has been found most useful as a plasticizer for cellulose nitrate and ethyl cellulose where low temperature flexibility and light stability are desirable.

Thus we have described the new and useful compound 4,6-di-tertiary-butyl-3-methylcyclohexanol and a process for preparing it.

We claim as our invention:

As a new product, the compound 4,6-di-tertiary-butyl-3-methylcyclohexanol.

ARTHUR C. WHITAKER.
WILLIAM W. WEINRICH.

REFERENCES CITED

The following references are of record in the file of this patent:

UNITED STATES PATENTS

| Number | Name | Date |
|---|---|---|
| 2,087,691 | Lazier | July 20, 1937 |

OTHER REFERENCES

Beilstein, "Handbuch der Organischen Chemie," vol. VI, supplement page 32.